(12) United States Patent
Mahoney et al.

(10) Patent No.: US 7,287,008 B1
(45) Date of Patent: Oct. 23, 2007

(54) METHOD AND SYSTEM FOR LOAN ORGANIZATION AND UNDERWRITING

(75) Inventors: John F. Mahoney, Oakland, CA (US); James M. Mohen, Stamford, CT (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

(21) Appl. No.: 09/475,153

(22) Filed: Dec. 30, 1999

(51) Int. Cl.
*G06F 17/60* (2006.01)

(52) U.S. Cl. .......................................... 705/38; 705/35
(58) Field of Classification Search .................... 705/1, 705/4, 10, 26, 35, 21, 38; 707/1, 10, 100–104
See application file for complete search history.

(56) References Cited

U.S. PATENT DOCUMENTS

| | | | | |
|---|---|---|---|---|
| 4,774,664 A | * | 9/1988 | Campbell et al. | |
| 5,323,315 A | * | 6/1994 | Highbloom | 235/379 |
| 5,636,117 A | * | 6/1997 | Rothstein | 705/4 |
| 5,680,305 A | * | 10/1997 | Apgar, IV | |
| 5,794,216 A | | 8/1998 | Brown | |
| 5,930,775 A | * | 7/1999 | McCauley et al. | 705/38 |
| 5,966,699 A | | 10/1999 | Zandi | |
| 5,995,947 A | * | 11/1999 | Fraser et al. | 705/38 |
| 6,021,400 A | | 2/2000 | Gallacher et al. | |
| 6,076,072 A | * | 6/2000 | Libman | 705/34 |
| 6,105,007 A | * | 8/2000 | Norris | 705/39 |

FOREIGN PATENT DOCUMENTS

WO    WO 99/03052    *    1/1999

OTHER PUBLICATIONS

Laudeman, "Risk–rating bring consistency to commerical lending", Commerical Lending Review v8n3, PP:28–39, ISSN: 0886–8204, JRNL Code: CLV, Dialog file 15, Accession No. 00729603.*

* cited by examiner

*Primary Examiner*—Frantzy Poinvil
(74) *Attorney, Agent, or Firm*—Buckley, Maschoff & Talwalkar LLC

(57) ABSTRACT

A system and method for use by a business entity for loan origination and underwriting in connection with real estate investment using a computer implemented application having a plurality of data input and dialog screens requiring one-time entry of data. The method includes steps to be followed in any sequence by one or more users of the business entity for using the system. The method includes inputting and storing loan origination information via data input screens, the information including financial and physical information relating to a specific real estate investment. The input loan origination information is dynamically compared with pre-determined rules and a dialog screen is displayed on a near real-time basis if any of said rules are violated. The input data is dynamically compared with other rules for determining the ongoing sequence of data input and dialog screens. Comparison with other rules results in the calculation of calculated values and automatically generated dialog text, some of which is automatically populated in word processing documents, an automated loan request and a credit application. The system includes both manual and automatic input of market data quantitatively describing the real estate market associated with the property, as well as multimedia data describing the property and the region surrounding the property. A report representing all of the stored input and calculated values are automatically produced in both paper and electronic form suitable for loan origination and underwriting.

19 Claims, 13 Drawing Sheets

FIG. 2

[Screenshot of ELVIS Version 3.00-Untitled application window showing "Screen Deal" interface]

Menu bar: File  Edit  Online  Activities  Help

ROI 0.00%   IRR #NUM!   Net Income $0

Tabs: General Info | PropertyCashFlow | Programs

Left sidebar buttons (52):
- Screen Deal
- Loan
- CF/Valuation
- Deal Recap
- Asset
- Market
- Execution
- Deal Analysis
- Loan App
- Credit Request
- Work Pad
- Images
- Pricing

General Info — MSA Name: _____   Short Term Risk   Long Term Risk

Deal Basics
- Deal Name
- Deal Type: Debt (60)
- Property Type: Suburban Office
- Is this a Pedestal Customer? ☐ (56)

Loan Terms
- Requested Loan Amount: ___
- Requested GECC Equity: $0
- Requested Term: 5  (61)
- Interest Rate Type: Floating

Property Address
- Street
- City
- State  Zip
- Country: US/Mexico

Details
- Loan Purpose: Acquisition (57)
- Purchase Price: $0
- Development Costs: $0
- Total Costs: $0
- Check here if Borrower Cash Out ☐
- Borrower Cash Equity: $0
- Immediate Capital Needs: $0
- Estimated Replacement Costs: $0

Property Metrics
- Square Feet: 0
- Class: Class B   At Market
- Year Built
- Rents Relative to Market

Estimated Risks (63)
- Asset Risk: 0.0    Market Risk: 0.0 (65)    Execution Risk: 0.0
- Overall Risk: 0.0
- Environmental Issues ☐   Details (54, 50, 58)

| Environmental Issues | | | | | |
|---|---|---|---|---|---|
| Attributes | Not Present | Green | Yellow | Red | Not Selected |
| Asbestos | | | | | ✓ |
| Lead Based Paint | | | | | ✓ |
| Lead in Drinking Water | | | | | ✓ |
| Radon | | | | | ✓ |
| Underground Storage Tanks | | | | | ✓ |
| Gas Station | | | | | ✓ |
| Contamination of Neighboring Properties | | | | | ✓ |
| Dry Cleaners | | | | | ✓ |
| Historical Uses of Property | | | | | ✓ |
| Dry Wells | | | | | ✓ |
| Industrial Parks | | | | | ✓ |
| Current Use Of Property | | | | | |

Significant amount of damaged friable asbestos present; abatement necessary as condition of tenancy, high expenditure to abate and remove Comments:

METHOD AND SYSTEM FOR LOAN ORGANIZATION AND UNDERWRITING

BACKGROUND OF THE INVENTION

The present invention relates generally to the documentation and evaluation of real estate investments, and more particularly, to automated real estate loan origination and underwriting processes from initial customer contact to commitment.

Methods for documentation and evaluation of real estate loan applications are well known in the investment industry, however, the specific sequence of steps directed toward preparation of the substantial necessary documentation and chosen method of analysis of the financial parameters are a matter of choice. For commercial and industrial real estate investment, the volume of supporting documentation and analysis is substantial, as are the dollar amounts and investment risk. Furthermore, consistency of such procedures and expeditious processing is important. To this end, proprietary computer applications have been developed by individual business entities, which automate individual aspects of the loan preparation, evaluation and authorization process.

In some cases, investment deals are compiled by business entity personnel who may be geographically distant from the central office, and possibly philosophically distant from the entity's investment policy and standards. Equally important, is early scrutiny of certain deal parameters against threshold parameters which serve to exclude potential real estate deals that fall outside the interests of the business entity. Consequently, the cost of compiling pertinent data and executing an appropriate and effective analysis of the data is an important factor. This is especially true for a business entity that conducts such transactions on a routine basis.

Computer applications directed toward compiling information about real estate property are known. For example, U.S. Pat. No. 5,794,216 describes an application program executed by a computer that includes a database containing multimedia information for each property, including images of the property, and database-stored parameters corresponding to portions of the image. The multimedia information includes market data and images of the property and neighboring circumstances.

Computer applications directed toward evaluating real estate are also known. For example, U.S. Pat. No. 5,680,305 describes a computer application that provides a method for evaluating real estate for use by a business entity. The application provides for storage of property description data, usage data, such as rental financial history, and other factors. A numerical "utilization indicator" is determined from these parameters, and after further processing, a "score" is developed, which represents a quantitative evaluation of the real estate property.

U.S. Pat. No. 5,966,699 describes a method for conducting electronic auctions of loan applications. In this method, a computer system connected to the Internet or other network electronically communicates "electronic" loan application forms from a prospective borrower to a loan authorizer, who maintains viable applications in a database, for subsequent electronic communication to one or more loan institutions for quotations.

Therefore, a data acquisition computer program is required for compiling loan origination information including financial and physical information relating to a specific property and multimedia real estate market information associated with the property, together with a credit request and loan application. The architecture of the computer program needs to be configured so as to provide consistency of processing among a variety of potential users through use of embedded choices, rules and financial models. The application should require only one-time entry of data in a non-linear sequence of data input screens, and should auto-populate documents with input data and generated values wherever appropriate. The system should be capable of electronically communicating loan documents to business entity personnel at any point during the document preparation process.

BRIEF SUMMARY OF THE INVENTION

The system and method according to the present invention employs a tool in the form of a personal computer application that automates the real estate loan origination and underwriting process for use by a business entity. The method of the present invention includes steps to be followed by one or more members of the business entity, as well as automated processes within the computer application. Some of the method steps are optional, and advantageously, all of the steps can be followed in any sequence.

While any of the steps of the method could be taken first, logically, and for purposes of description, the first described step of the method of the present invention is the step of storing in the computer application the basics of the real estate loan application, or "deal", including property location, property metrics, estimated risks, loan terms and other loan and borrower details, by input of such values on one or more input screens. The next series of steps include data entry into a number of subsequent screens, in any order. Some of the subsequent screens test data inputs against pre-stored rules and based on the results of the tests, display information and commentary. The pre-stored rules are defined according to underwriting and pricing guidelines acceptable to the business entity. Other screens auto-populate certain fields with calculated results obtained by analysis of debt and equity data, using known financial models.

The system makes available to the user a set of computer screens presented in a generally non-linear sequence. The particular sequence of presentation is arranged to be under user control while at the same time, the sequence is also responsive on a real-time basis to the input data. In this way, the sequence of screens displayed for any given deal dynamically vary, depending on data entry.

Advantageously, in another step of the method, the system makes available to the user word processing-based documents, such as a loan application and credit request, which have been pre-formatted and auto-populated by the system with both input data and calculated data. In the preferred embodiment, the user initiates a one-way link (accomplished automatically by system utilization of known Windows-based, dynamic links) between the application and the word processing application present on the same computer as the system of the present invention.

For example, in the preferred embodiment, a "Key Metrics" portion arranged to appear within either a credit request or preliminary loan application is generated, in which selected financial data, such as profitability values such as investor rate of return (IRR), return on investment (ROI), net operating income (NOI), loan structure values, and performance calculations, are arranged in a standard format. These documents are available for editing by one or more members of the business entity, for example, by including paragraphs of text commentary and description. These documents become part of the overall loan origination package made available for subsequent evaluation internal to the business entity and quotation by financial institutions.

The system takes advantage of intranet and Internet connectivity to enable collaborative data input and evaluation among potentially geographically disparate users. Accordingly, in another optional step of the method, a user can instruct the system to initiate a network communication with other members of the business entity regarding a particular loan application. Optionally, the system can be instructed to copy selected data screens to a server storage location and automatically populate an email message with either attached data screens or hyperlinks to the storage location of the data screens.

Other steps of the method of the present invention include accessing the remaining data input screens of the system. It is expected that an implementation of the present invention includes screens tailored to the needs of the business entity, and therefore specific screens and screen contents will vary, depending on the needs and preferences of the business entity. As a non-limiting example, additional screens include a "Loan" screen for input of loan-related data, a "Cash Flow/Evaluation" screen, which includes various income/expense-related sub-screens, a "Deal Recap" screen, which summarizes the deal, based on all subsisting data, a "Market" screen which provide for input of the results of an analysis of the market associated with the property to be financed, and an "Asset" screen, which provides for input of the physical features of the property. In some cases, the system provides commentary dynamically responsive to the input.

Also included in the preferred embodiment is an "Execution" screen, which provides for input of subjective information characterizing the borrower in terms such as, for example, property experience, market experience, financial wherewithal, and forecasted reaction to adverse conditions, including specified types of litigation and criminal activity.

A "Deal Analysis" screen is included, which dynamically adjusts to the input data and calculated values, thereby providing a summary listing of attributes. Advantageously, this screen displays in a single location, the rules/guidelines which have been activated as a result of data input. Also included are "Loan Application" and "Credit Request" screens, in which pertinent data is input and organized into final form for processing. An "Execution" screen is included, which provides input of subjective information characterizing the borrower in terms such as, for example, property experience, market experience, financial wherewithal, and forecasted reaction to adverse conditions, including specified types of litigation and criminal activity.

A work pad screen taking the form of a spreadsheet, is provided for general use. An "Image" screen is provided, in which images captured by known Microsoft Windows-based methods, or the equivalent, can be added, deleted, arranged and reviewed. Typically, imaged maps and photographs of the site are included as input to the Image screen.

The result of operation of the steps of the system and method of the present invention is the compilation of information that is input, screened and edited by one or more team members having expertise pertinent to individual data types. This compilation includes calculated values obtained by execution of algorithms, i.e., financial models, that analyze debt and equity investments. Also included are multimedia files, such as imaged maps and photographs of the property and surrounding geographic area. This compilation is automatically arranged in any desirable output format, including a loan origination package made available for subsequent evaluation internal to the business entity and, as desired, quotation by financial institutions. Other automated outputs are possible, such as, for example, a loan request.

BRIEF DESCRIPTION OF THE DRAWINGS

FIG. 2 illustrates an example of a "Screen Deal" input screen for entering basic data, according to the present invention;

FIG. 7 illustrates an example "Asset" input screen, according to the present invention;

FIG. 9 illustrates an example "Execution" input screen, according to the present invention;

FIG. 10 illustrates and example "Environmental Issues", input screen according to the present invention;

FIG. 12 illustrates an example "Loan Application" input screen, according to the present invention;

DETAILED DESCRIPTION OF THE INVENTION

Embodiments of the present invention include a data acquisition computer program for compiling loan origination information including financial and physical information relating to a specific property and the real estate market associated with the property, together with a credit request and loan application, other outputs as desired, and steps of a method for using the program. The architecture of the computer program, or application, is configured to provide the benefit of consistency of processing among a variety of potential users, in some cases through ample use of embedded menus, from which the user makes an informed selection among fixed choices for a given data field. Rules imbedded within the application and associated with one or more data input fields automatically operate to assist the user in compiling a data conforming to standards and policies of the business entity. Similarly, use of known fixed financial models, although optionally, a choice among models can be provided, further contributes to consistency of loan origination and underwriting. The application is configured so that specific data entries are made only once by the user, leaving to the application the task of populating copies of that input data into other fields, as necessary.

Importantly, as a result of the non-linear flow of the data input screens, input can be made at the convenience of each user, and is not system-driven. Moreover, emphasis on network-connectivity among users and interested parties, enables conveyance of early (partially complete) versions of a particular compilation of data describing pertinent real estate market demographics, the physical, financial, and usage data relating to a specific real estate property, together with loan and credit applications, collectively referred to as a "deal", to business entity personnel who, in other loan originating arrangements, might be the last, or nearly the last to review the deal. Such early scrutiny has been shown to be very effective in forestalling deals which fall outside the standards or interests of the business entity. It has been recognized that input from such individuals helps to formulate the initial version of the deal and avoid unnecessary delay resulting from re-writes.

Figure 1:
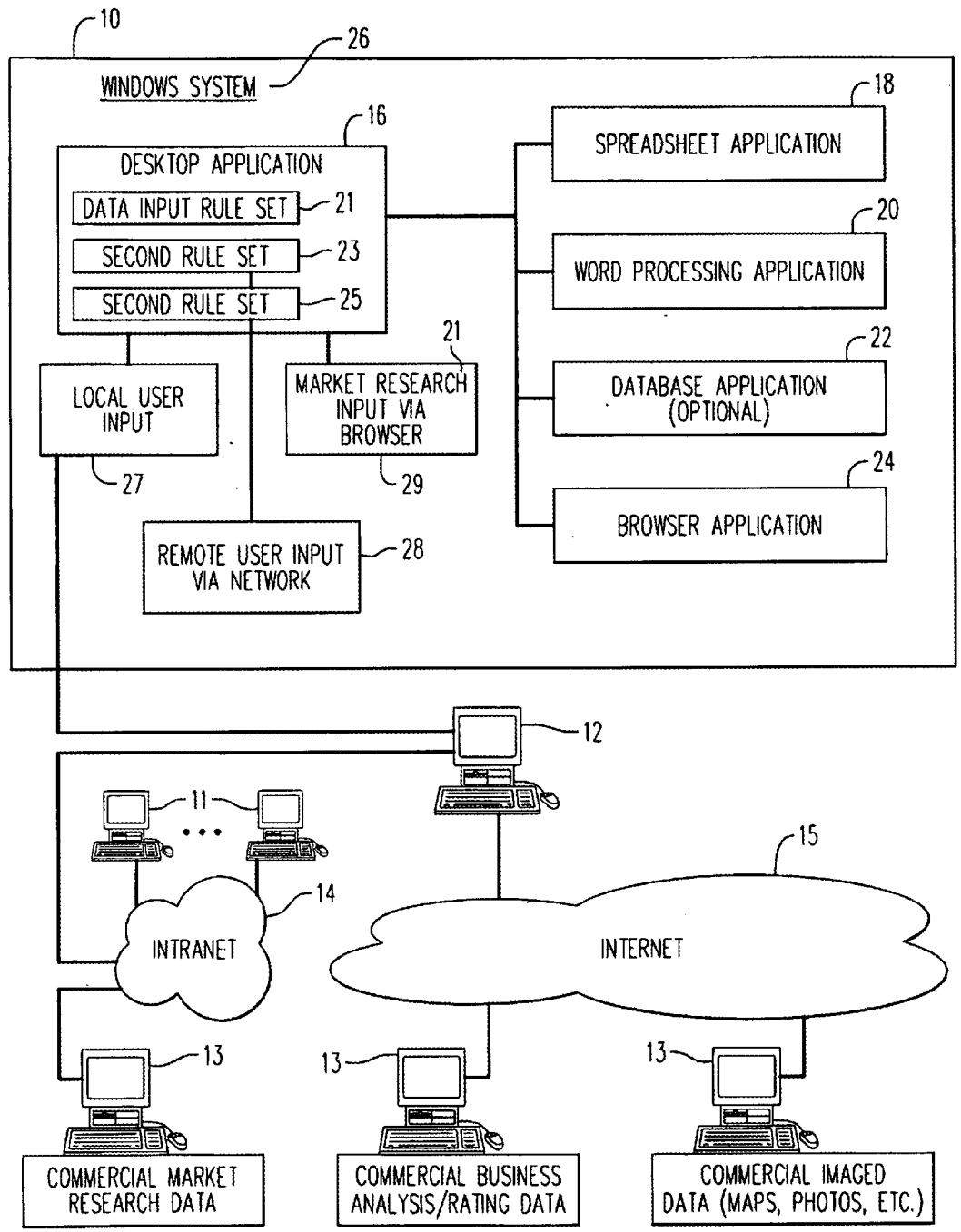
FIG. 1 is a simplified block diagram of an overall computing environment including a computer system 10 of the present invention.

FIG. 1 is a simplified block diagram of an overall computing environment including a computer system 10 of the present invention, including at least one computer 12, which preferably is a personal computer, and a plurality of computer applications arranged to operate in computer 12. Computer system 10 is arranged to cooperatively connect to external data sources 13 over a network. External sources 13 include data sources arranged to make data available upon demand over an intranet (14), or the Internet (15), as applicable. Computer 12 is arranged to operate both independently of, and connected to, network 14, 15, which optionally, can be an intranet or the Internet. Computer 12 is also arranged to operate a plurality of applications, including at least one desktop application 16 directed to loan origination and underwriting, written in a suitable programming language, such as, for example, the Delphi (trademark of InPrise Corporation) programming language, a spreadsheet application 18, such as, for example, Excel (trademark of Microsoft Corporation), a word processing application 20, such as, for example, Word (trademark of Microsoft Corporation), an optional database application 22, such as, for example, Access (trademark of Microsoft Corporation), an internet browser application 24, such as, for example Internet Explorer (trademark of Microsoft Corporation), and other applications, as appropriate.

In an alternative embodiment, a database application running on a central sever is arranged to capture and archive summary information or file copies for general use within the business entity, or to facilitate collaboration. Personal computers 11 suitably network-connected to computer 12 enable other members of the business entity to communicate with the user of computer 12. In the preferred embodiment, computers 11 and 12 are configured to be interconnected upon demand, via intranet 14 and also by corporate LAN/WAN networks (not shown). Such communication includes electronic mail. Optionally, at least one of personal computers 11 is a server configured and arranged to perform known server functions, including storage of data files, and operation of web-related applications for communicating stored data to users via intranet and internet connections.

The desktop application 16 is configured and arranged to include local user input 27, i.e., data entered by a user at the personal computer on which application 16 is running. Local user input 27 is verified against a set of pre-determined input rules 21 resident in application 16. Input rules 21 are automatically activated by application 16 upon data entry by the user, and are configured to screen input for typographical errors and logical errors. Remote user input 28, i.e., data communicated over a suitable network from other business entity personnel is communicated to the local user generally in the form of email and optionally, via documents attached to email. The local user transfers this information, as appropriate, as data input 27 to the application. Similarly, the local user accesses commercial sources 29 external to the business entity, and initiates data transfer to application 16.

A desirable operating system 26 is Windows (trademark of Microsoft Corporation), OS/2 (trademark of IBM Corporation), or any such other operating system that supports the use of an extended memory, a DLL loading function, and a virtual storage, multi-window GUI environment.

FIG. 2 illustrates, but not by way of limitation, an example arrangement of a computer input screen 50 for entering basic data pertaining to a request for a loan in connection with a specific real estate property. The example input screen 50 titled "Screen Deal", is one of a series of input and informational screens comprising the system 10 of present invention. The data input from all of these screens is stored in the database application 22 linked to desktop application 16. System 10 includes a computational program that is configured to perform arithmetic calculations and comparisons of the input data. The computed results are also stored in the database application 22. In the preferred embodiment the database application and computational program is a commercially available spreadsheet application 18.

System 10, in the preferred embodiment, is configured and arranged to automatically populate one or more associated spreadsheets by way of a data input and display application including data input screens such as screen 50 and other screens to be described. Also, informational screens are provided, which generally reflect calculated results of data entered into the associated spreadsheet, and may pose summaries, questions or warnings to the user, based on subsisting input data. Return On Investment (ROI), Internal Rate of Return (IRR) and Net Income are displayed at the top of every screen, and represent the deal's (either debt or equity) profitability. These values are constantly updated as the user provides information into the system. In a separate embodiment, system 10 also populates selected input and calculated values into a database associated with a commercially available database application that is dynamically linked with the input and display application, and is a part of, system 10.

Screen Deal input screen 50 includes several features that advantageously appear on all screens of the present invention. Generally, included is a display of any set of icons, which, upon user selection using known Windows techniques, direct system 10 to display a corresponding, respective screen. For example, in the preferred embodiment, button icon channels 52, called "channels" for convenience, are displayed on the left side of screen 50, which direct system 10 to display screens corresponding to each major screen or suite of screens, described below. As a result, the user can conveniently navigate randomly from any particular screen to any other screen by known Windows navigation techniques.

Additional features in common with all screens of system 10 include functional pull-down menus 54, which also are a known feature of Windows applications. These pull-down menus are screen-specific and offer functionality tailored to the currently displayed screen. For example, in the preferred embodiment, the pull-down menus labeled "File", "Edit", "Online", "Activities", and "Help", appear at the top of screen 50.

Other features in common with all screens of system 10 include guideline warnings representing rule violations, which are displayed throughout the application, as well as being summarized in a "Deal Analysis" channel. Guideline warnings are displayed as appropriate, based on system logic, which responds to both input data as well as calculated values.

The screens of system 10 optionally are suites of screens corresponding to the channels 52. For a given channel, a corresponding suite of screens are identified by tab icons 56 near the top of the input area of each screen. These tabs enable the user to switch among members of the suite. Any set of input or informational screens sufficient to display pertinent fields can be included. For example, in the preferred embodiment, Screen Deal suite of screens 50 includes "General Information", "Programs" and "Property Cash Flow" tabs and corresponding screens, described below. Inclusion of such screens in the design of the system 10 is based both on the need for input data, as well as providing direction to the system, based on the data input. For example, in the preferred embodiment, the "Programs" tab provides a screen that offers a selection of programs to the user, each program being arranged to employ a respective financial model to be used for debt and equity analysis. Moreover, the content and availability of other screens is dynamically determined according to specific data entered on any given screen, as described further, below. This process comprises automatic application of a set of pre-determined rules 23, stored within application 16, as data fields are entered.

FIG. 2 also shows an example "General Information" screen 51, indicated by a tab 58 of the same name. This screen includes data input fields labeled according to the data type intended for input. Each field is connected to an associated spreadsheet and the input data is made available for subsequent computation, as described below. Specific computations are effected by application of pre-determined computation rules 25, which are part of application 16. Although screen 50 can include any number of appropriate input fields describing the property, risk, and loan terms, as understood in the loan origination industry, the preferred embodiment includes general information fields 59 describing the Property Location, Property Type, metrics such as Size and Year Built. For example, one selection of industry-standard input fields relating to risk 60 includes Estimated Risk Values, including Asset Risk, Market Risk, and Execution Risk. Still other input fields relating to loan terms 61, including requested loan amount, requested term, interest rate type, loan purpose, and purchase price, input fields relating to borrower cash and capital needs. Screen 50 is arranged to display a Calculated Overall Risk Value 63 based on the estimated risk values 61. Any field, such as "Loan Purpose" 57, can have an associated pull-down menu of choices, the selection of which results in auto-population of the corresponding input field. Advantageously, restriction to a selection from a fixed menu of choices achieves consistency among users.

Figure 3:
FIG. 3 illustrates an example "Property Cash Flow" input screen, according to the present invention.

FIG. 3 illustrates an example "Property Cash Flow" arrangement 62, obtained when the user selects tab 64 labeled "Property Cash Flow" from tabs 56 located near the top of Screen Deal 50. In the preferred embodiment, inputs made to screen arrangement 62 are incorporated into calculations made by an attached spreadsheet. Icon buttons 70 revealing pop-up worksheets such as, for example, "Average Economic Occupancy Growth", "Rental Growth" and "Other Growth" are located adjacent pertinent input fields on screen 62, so that tabular input of growth data corresponding to, for example, six years of experience, can be entered by the user onto respective worksheets, calculated and returned as a calculated result, which is available for manual or optionally, automatic input into the appropriate field in screen 62. In addition, other economics data input fields 71 include a "Effective Gross Income" value, a "Net Operating Income" value and a "Cash Flow After Reserves" value. In addition, detailed operating expense input fields 72 and tenant improvement costs and leasing commission values are input in screen 62. Advantageously, a tenant improvement and leasing commission calculator is provided in the form of a pop-up window for the convenience of the user. This calculator provides a window formatted to receive this data, and calculates sums of the data input. Provision is made for input of multiple years of expense values, which are made available for subsequent computation and display, as necessary.

FIG. 3 also includes a "Programs" tab 73, the selection of which instructs system 10 to display a screen (not shown) including selectable program options. In instances in which the business entity uses more than one "program" of threshold values for selected parameters, thus screen offers a selection button associated with each program option. Preferably, the choice of options that are displayed is dynamically dependent on subsisting data entered into the application. The user selection of a program results in a respective arrangement of automatically populated values into all pertinent data fields. Each program of thresholds and associated preferences are determined by the business entity.

Figure 4:
FIG. 4 illustrates an example "Loan" input screen, according to the present invention.

FIG. 4 illustrates an example suite of loan screens which are obtained through user selection of icon button channel 74, labeled "Loans", from channels 52, which are visible on every screen presented by system 10. In the preferred embodiment, selection of "Loan" button 74 instructs system 10 to display the first of the suite of screens, each titled "Loans", wherein each screen is further identified by a tab including a descriptive sub-title. User selection of the "General Terms" tab 75 instructs system 10 to display the corresponding screen. Optionally, other tabs, which can be selected in any order, indicating additional screens related to "loans", are displayed near the top of the screen.

Advantageously, if the deal is an equity deal, as determined by selection of "Equity Deal Type" on the General Information screen of the Screen Deal suite of screens, then the suite of loan screens is replaced with a Deal Structure suite of screens (not shown). Deal Structure screens include data input fields characteristic of equity deal types, and are comparable to the suite of loan screens. In addition, the Loan Application and Credit Request suites of screens are also changed to be reflective of the information/structure needs of an equity transaction.

In the preferred embodiment, with the general terms screen 75 displayed, the user can select from pull-down menus options for "Lien Position" 76, which includes, for example, selectable fields labeled "First" or "Second Mortgage" or "Equity/Joint Venture". Advantageously, this fixed Flow", % of Residual", and "Minimum Residual Participation". "Origination and Prepayment Fees and "Rate" input fields 79 and "Prepayment Options" fields 80, including parameters known in the loan origination industry.

In one embodiment, the suite of "Loans" screens represented by the General Terms screen 75, optionally includes other screens (not shown), each accessed by a tab. For example, in FIG. 4, a "Sources" screen is displayed in which system 10 populates the screen with summary information relating to funding "sources" and corresponding "uses", in balance-sheet format. Other screens can provide input fields for borrower cash equity, additional collateral, and earnout, as well as input fields relating to senior debt and annual debt service.

Figure 5:
FIG. 5 illustrates an example "Cash Flow/Valuation" input screen, according to the present invention.

FIG. 5 illustrates an example Cash Flow/Valuation suite of screens, with the "Valuation" screen 81 displayed. "Valuation" screen 81 provides input fields for "Direct Capitalization" values 82, "Discounted Cash Flow" 83, and "Sales Comparables" 84. The default calculations for these values consist of a mixture of user inputs and values driven by the system logic of system 10. The user has the discretion of overriding both the input and the calculated values, should specific circumstances of the deal so dictate. In the preferred embodiment, in general, data fields associated with capital funding are auto-populated from other inputs to other screens. A "Percent Direct Capital" input field 85 is provided. A pull-down menu of calculation method selections 86 including "Average/Current Proforma NOI", "Current NOI", and "Proforma NOI". In addition, text fields 86 are available for entry of user comments.

FIG. 5 also shows other tabs representing additional screens included in the suite of Cash Flow/Valuation suite of screens 81, including tabs 87 labeled "Income By Year", "Expense By Year", and "Capital Expenditures By Year". These screens include data input fields known in the loan origination industry, for example, "Income By Year" includes, for example, net rental income, expense recoveries and other income fields. The remaining screens of the suite include similar known inputs for expense and capital expenditures. Advantageously, in the preferred embodiment, pop-up worksheet screens are available to tally a number of years-average economic opportunity, and various types of income growth, as necessary. The number of years presented dynamically changes based on the loan term. In addition, system 10 trends forward the data input on the Screen Deal—Property Cash Flow screen, based on the growth rates previously assigned by the user.

Figure 6:
FIG. 6 illustrates an example "Deal Recap" input screen, according to the present invention.

FIG. 6 illustrates an example Deal Recap suite of screens, with the deal recap screen 90 displayed. Screen 90 provides an informational display of a "Deal Overview" 91 of the deal in terms of selected values of interest to the business entity. Any selected values can be displayed according to preferences of the business entity. For example, in addition to size and commitment amount, specific calculated underwriting values are displayed. Pricing values are displayed along with return values, including, for example, ROI, net income and IIR. Optionally, the details of these return values and other associated values, as identified by the business entity, are displayed in one or more additional informational screens.

Figure 7:
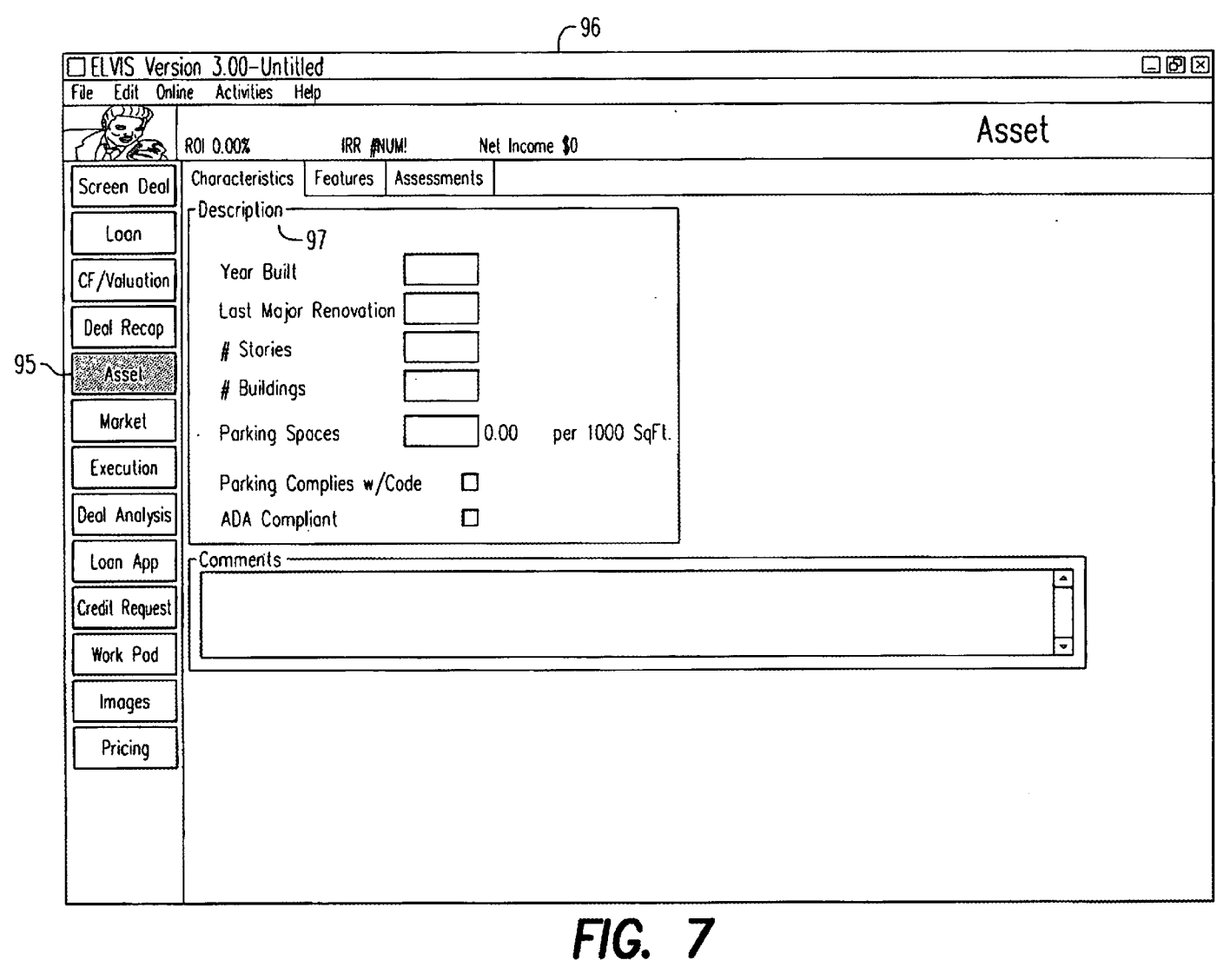

FIG. 7 illustrates an example suite of "Asset" screens which are obtained through user selection of icon channel 95, labeled "Asset", from icon button channels 52. In the preferred embodiment, selection of "Asset" channel 95 instructs system 10 to display the "Characteristics" screen 96, indicated by an icon tab of the same name, displayed near the top of the screen. Assets screen 96 includes asset "Description" fields 97, which include pertinent data fields known in the loan origination industry. Optionally, other input screens providing input fields for additional asset-related fields can be provided as necessary, and identified by selectable icon tabs.

Figure 8:
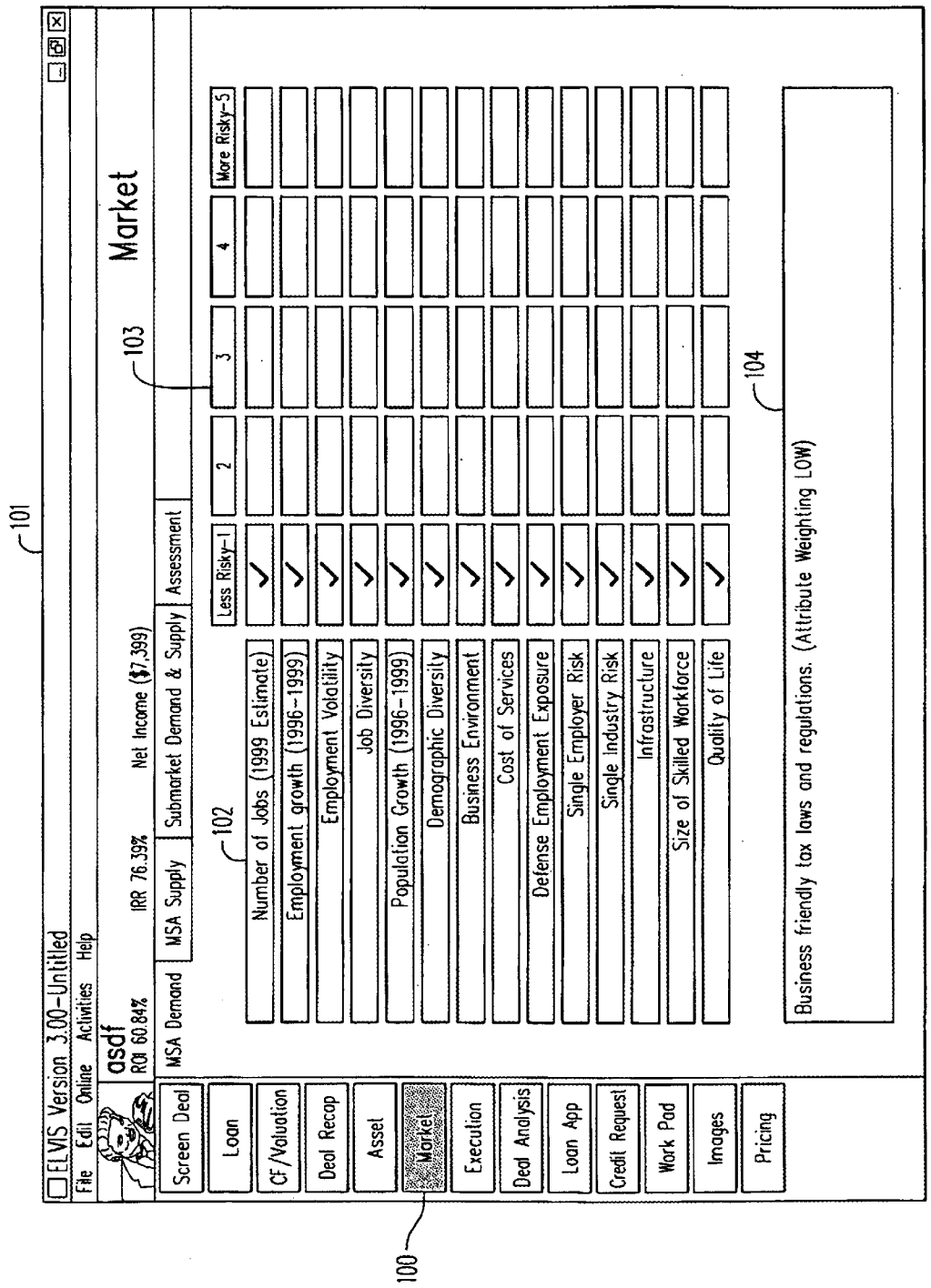
FIG. 8 illustrates an example "Market" input screen, according to the present invention.
Figure 9:
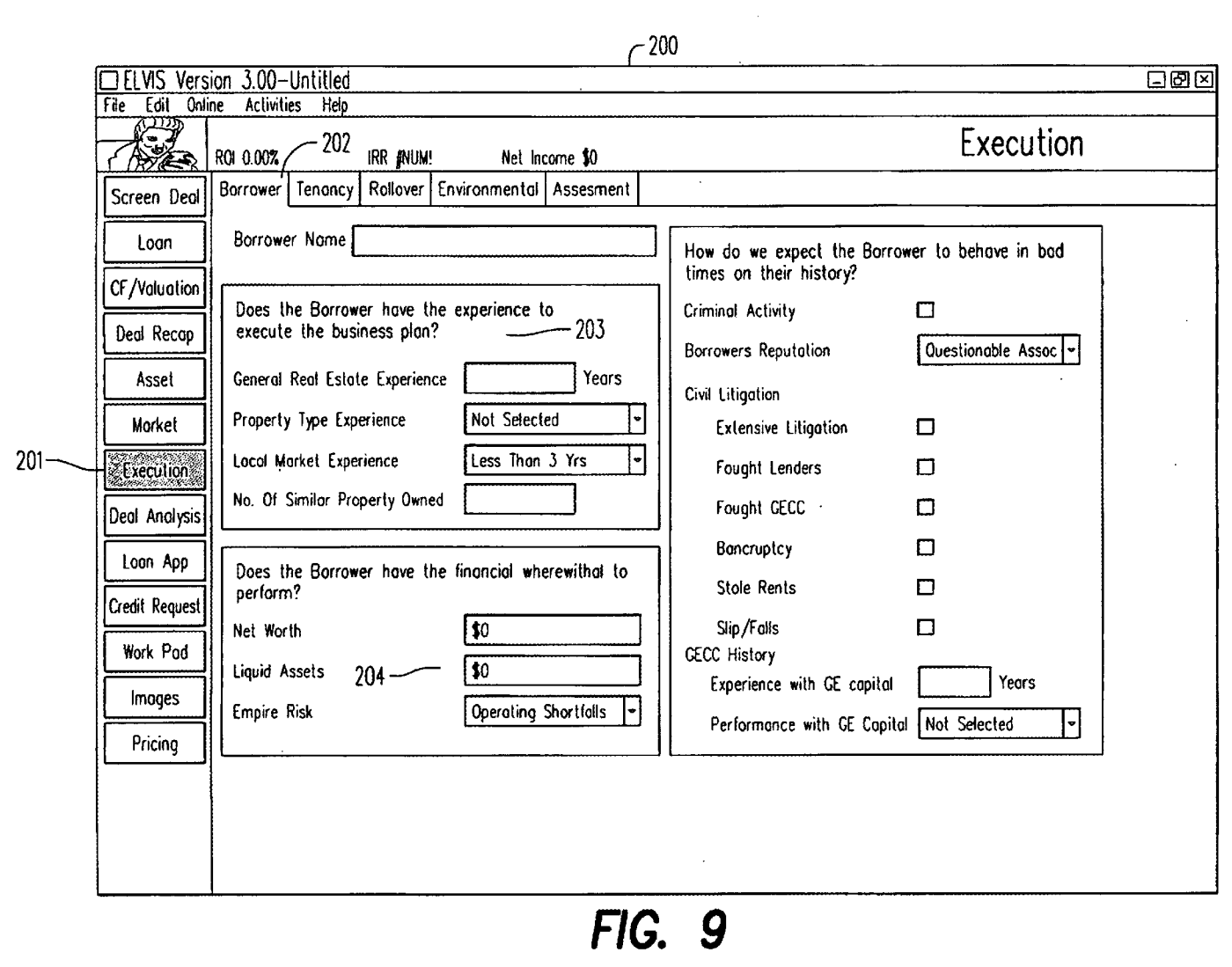

FIG. 8 illustrates an example suite of "Market" screens which are obtained through user selection of channel 100, labeled "Markets", from icon button channels 52. In the preferred embodiment, selection of "Market" channel 100 instructs system 10 to display a market demand screen 101 labeled "MSA Demand", which is one of several metropolitan statistical area analysis screens. These screens can be configured to display any number of data input fields pertinent to characterizing market demand. In the preferred embodiment, screen 101, as shown in FIG. 9, is arranged in a grid format, in which at the left side is a list of market descriptors 102, and across the top of the grid are column titles 103 indicating degrees of risk, including, for example, "less risky-1", "2", "3", "4", "5-more risky", and "not selected". The user optionally selects, for each listed market descriptor, an icon button from the appropriate column of degrees of risk button icons. A check-mark icon appears as overlaying each selected button. Advantageously, for each position of the Windows pointing device over a button icon, an information window 104 dynamically changes to display both definitions and experience-based information for that particular combination of risk and market descriptor.

In the preferred embodiment, the market demand screen 101 includes market descriptors such as, for example, number of jobs, employment growth, employment volatility, job diversity, population growth, demographic diversity, business environment, cost of services, defense employment exposure, single employer risk, single industry risk, infrastructure, size of skilled workforce, quality of life.

Also in the preferred embodiment, the market demand screen 101 includes "User Selected Market Risk" field 105, which is auto-populated by system 10 with a value developed from previously entered numeric risk data, and a "Calculated Market Risk Rating" field, which is auto-populated by a calculated sum representing the above-described, subjective data indicated by checked grid buttons. Optionally, guideline warnings characterizing the disparity between these two risk rating values are auto-populated in a word processing document. A user, who edits such a document, would thereby have the opportunity to further expand on the reasons surrounding the difference in risk assessment.

Another metropolitan statistical area (MSA) analysis screen titled, for example, "MSA Supply", (not shown) includes market descriptors such as, for example, metropolitan statistical area total inventory, metropolitan statistical area total inventory trend, metropolitan statistical area total inventory condition, metropolitan statistical area occupancy, metropolitan statistical area absorption per year, and metropolitan statistical area growth constraints.

Still another metropolitan statistical area titled, for example "Sub market Demand & Supply", (not shown) includes market descriptors such as, for example, overall metropolitan statistical area demand, overall metropolitan statistical area supply, overall submarket demand, overall submarket supply.

FIG. 9 illustrates an example suite of "Execution" screens 200 which are obtained through user selection of channel 201, labeled "Execution", from icon button channels 52. User selection of icon tab 202, labeled "Borrower" instructs system 10 to display a "Borrower" screen 201, which includes data input fields 203 which answer the question, "Does the Borrower have the experience to execute the business plan?". These fields include borrower name, general real estate experience in years, property type experience in years, local market experience in years and number of similar properties owned. Input field grouping 204 includes input fields are intended to answer the question, "Does the Borrower have the financial wherewithal to perform?", including net worth, liquid assets and empire risks, which includes user-selectable options, including operating shortfalls, highly leveraged, contingent liabilities, and difficulty with lenders.

A third borrower grouping of input fields 205 are intended to answer the question "How do we expect the Borrower to behave in bad times on their history?" These fields include check-mark icon entries for criminal activity, various civil litigation-related actions, and history with the business entity. Similar questions in connection with the tenant(s) can be provided.

FIG. 10 illustrates another input screen 66 titled "Environmental Issues" of the Execution suite of screens 200. Screen 66 lists pre-determined environmental issues 67 arranged as the vertical component of a grid pattern. Across the top of the grid pattern are displayed five column headings 68, for example, "Not Present", "Green", "Yellow", "Red", and "Not Selected", although any suitable set of headings will suffice. Arranged within the grid, beneath the column headings, are icon buttons 69, which the user selects according to a judgement of the degree of presence of a respective environmental item. Each selection results in the display of an icon checkmark, and mere location of the Windows cursor results in the appearance of explanatory commentary in an information window 55. Included also, is a text-input window, made available for the user to add comments.

Figure 11:
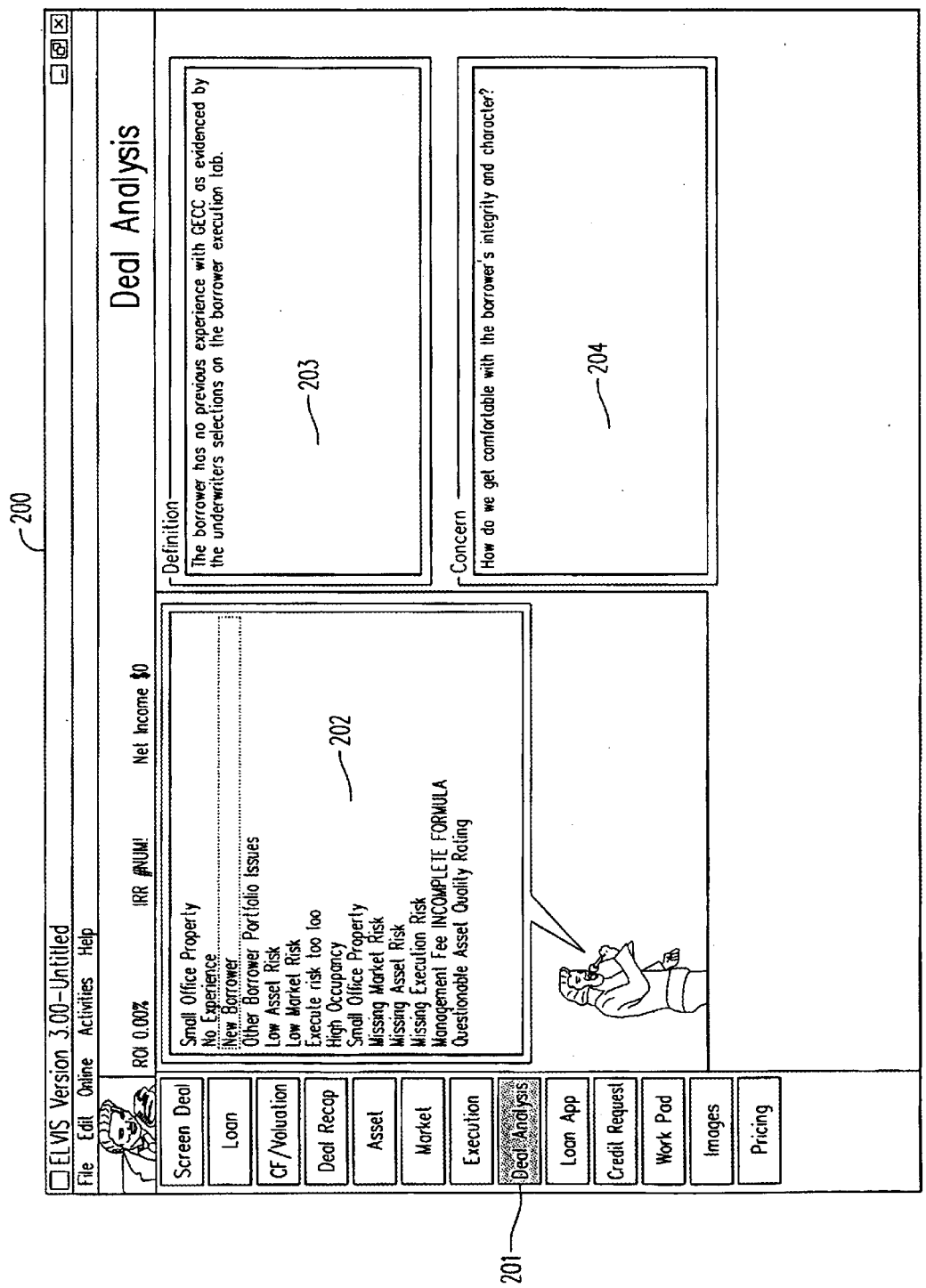
FIG. 11 illustrates an example "Deal Analysis" input screen, according to the present invention.

FIG. 11 illustrates an example of a deal analysis screen 210, which is obtained through user selection of channel 201, labeled "Deal Analysis", from icon button channels 52. Deal Analysis screen 201 is an informational screen displaying a list 202 of all guideline/rule warnings responsive to data input to-date. This list is a dynamic list drawn from a library of text descriptors each of which characterizes a specific aspect of the deal. For any given deal, the list automatically reflects an analysis of the numeric input data, the system-calculated values, and the non-numeric characterization inputs, e.g. the risk analysis described in connection with other input screens. Advantageously, a display of explanatory text appears in a window 203, when the user selects each listed characterization. Where appropriate, the text includes context-sensitive data (pertinent to the current deal) embedded within the explanatory text. A questions window 204 is provided, also corresponding to each listed characterization, in which system 10 displays key questions dynamically based on data provided in other input screens.

Figure 12:
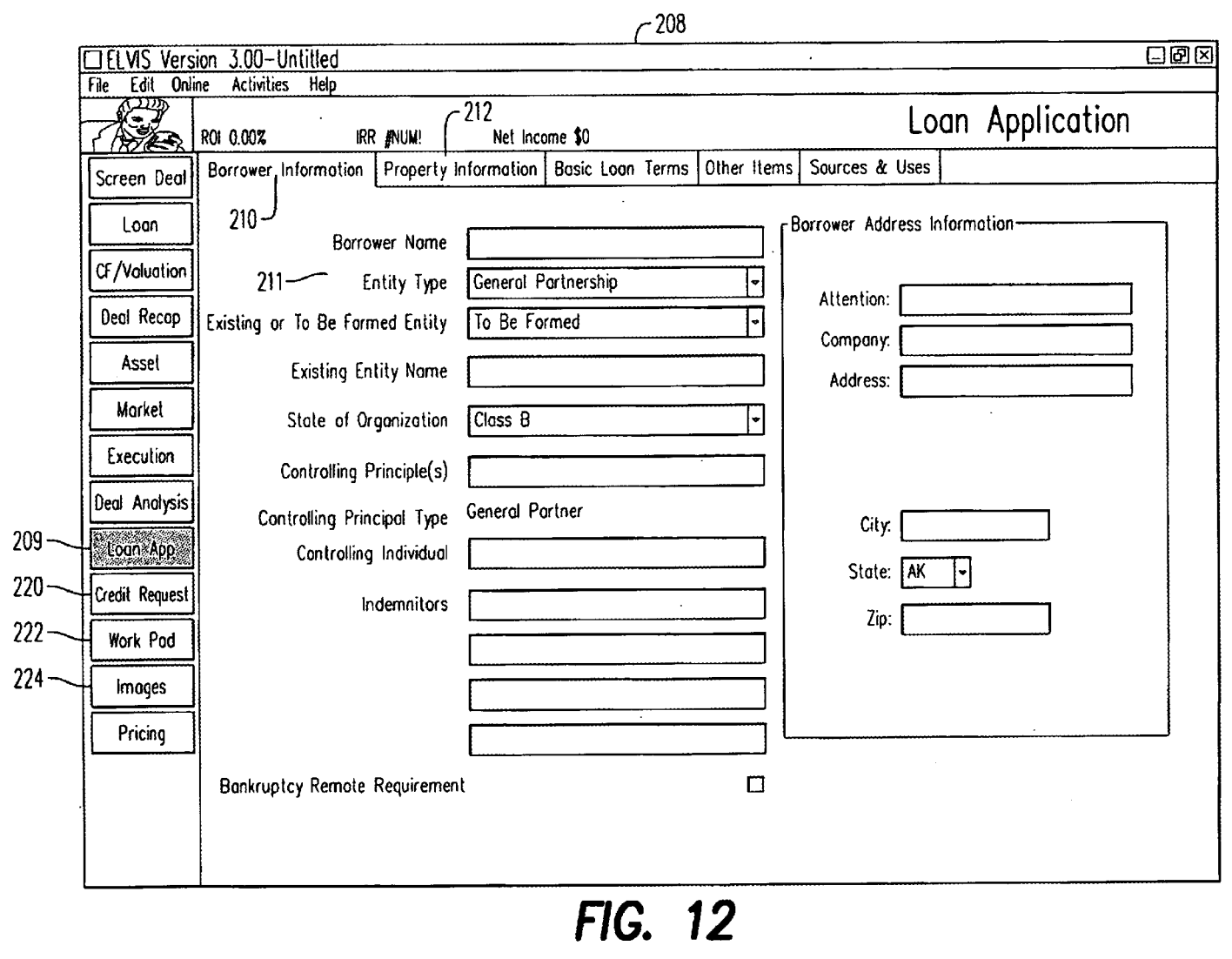

FIG. 12 illustrates an example suite of loan application screens 208 which are obtained through user selection of channel 209, labeled "Loan Application", from icon button channels 52. The Loan Application channel 52 instructs system 10 to display the "Borrower Information" screen 210. Screen 210 includes data fields 211 identifying the borrower, including name, address, entity type, state of organization, along with fields identifying controlling principal(s), and indemnitors. Most, and potentially all of these fields are auto-populated by system 10, using previously input data. This will depend, of course, on the sequence of input screen selection, and completeness of data entry, as of the selection of the Loan Application channel 209. Other screens (not shown) optionally included in the Loan Application suite 208 display all information known in the loan origination industry as necessary for comprising, a complete loan application. Specific requirements may vary and are typically defined by the business entity. For example, Loan Application screen 210 shows exemplary tabs respectively titled "Property Information" 212, "Basic Loan Terms" 213, "Source and Uses" 214 and "Other Terms" 215, as indicative of such information screens. The data fields of Loan Application screen suite 208 are used by system 10 to automatically generate a loan application suitable for printing or electronic transmission to a loan underwriting entity.

As indicated in connection with FIG. 4, which illustrates a suite of loan screens, if the deal type is a debt deal, then the suite of loan application screens shown in FIG. 12 are displayed. If the deal type is an equity deal, as determined by selection of "Equity Deal Type" on the General Information screen of the Screen Deal suite of screens, then the suite of loan application screens 208 is replaced by a suite Credit Request screens which reflect the information/structural requirements of an equity transaction.

FIG. 12 shows channel 220, labeled "Credit Request" among icon button channels 52, the selection of which instructs system 10 to display a suite of "Credit Request" screens (not shown). The Credit Request screens include the same information display fields as described in connection with "Loan Application" screen suite 208. Potentially all of these fields are auto-populated by system 10, using previously input data, depending on prior completeness of data input. The data fields of Credit Request screens associated with the Credit Request channel 220 are used by system 10 to automatically generate a credit request suitable for printing or electronic transmission to a credit approval entity.

FIG. 12 also shows, selection of a channel labeled "Work Pad" 222 provides to the user a screen having basic spreadsheet capability, for use as a convenient calculator for incidental calculation.

Figure 13:
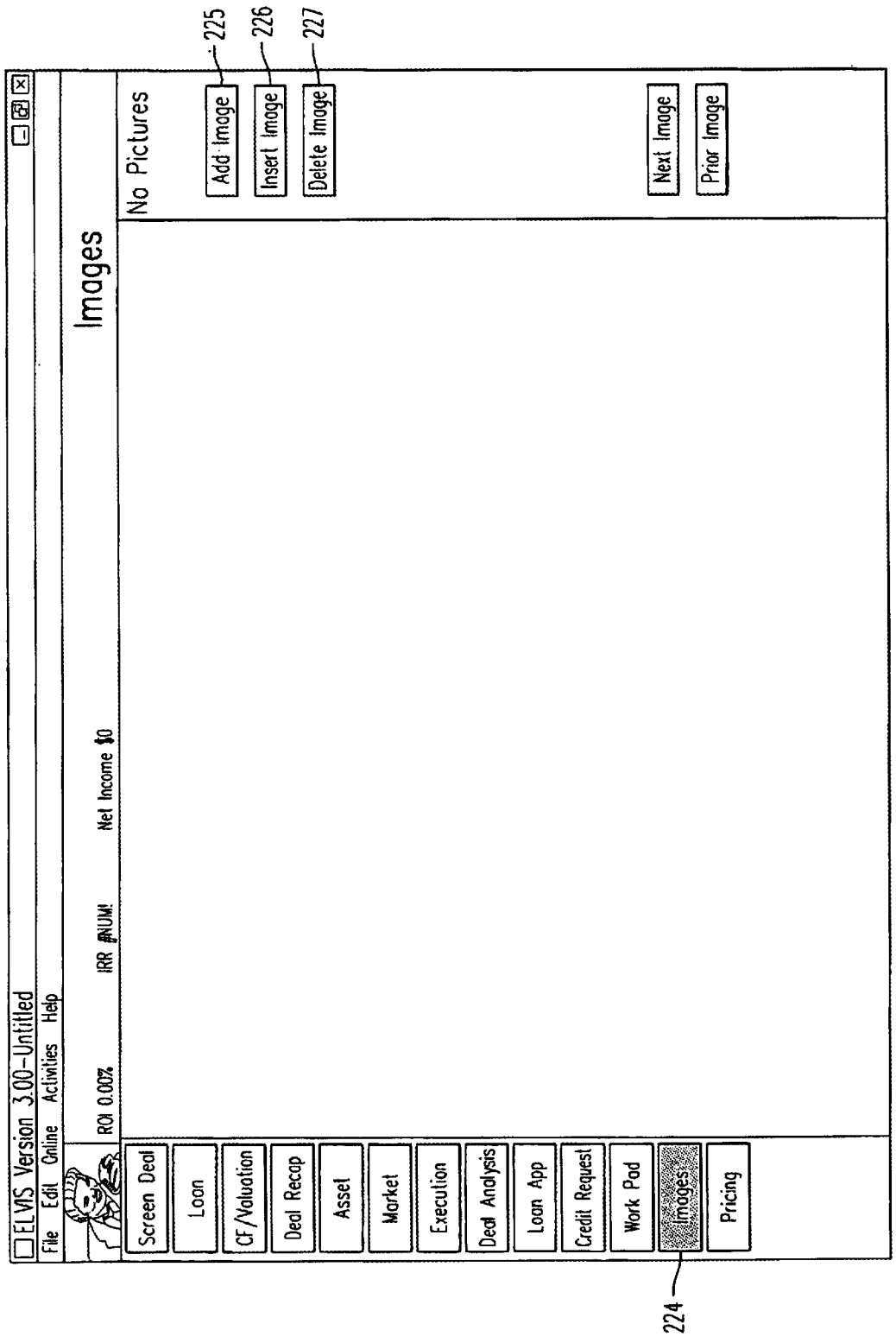
FIG. 13 illustrates an example "Images" input screen, according to the present invention.

FIG. 13 illustrates a channel 224 labeled "Images", which upon user selection, enables the user to add, insert, and delete images, by selection of buttons 225, 226 and 227, respectively. After images are input and arranged in desired sequence, the user can instruct system 10 to sequentially display the images by selecting navigation keys 232. These images are also moved by system 10 to either the Preliminary or Credit Request word processing documents along with the other deal-related information.

Referring to any of FIGS. 2–13, a set of menu choices are displayed at the top of each screen, including standard Windows choices such as "File", "Edit" and "Help". In the preferred embodiment, other functionality is also included in the form of menu choices. For example, a menu choice is configured to provide a view of deals grouped by category, such as geographic region, state, or product type (apartment, commercial, etc.). Optionally, system 10 calculates a comparison of any of a group of data fields of interest to the business entity (currently these are "canned reports).

Advantageously, a copy of the deal recap screen 90, illustrated in FIG. 6, is made available on one or more networks, according to the needs of the business entity. Preferably, the copy of screen 90 is made available on the business entity intranet. The copy of screen 90 is created automatically when a user saves for the first time and is then automatically updated on each subsequent save. This functionality requires that the user be connected to the network, for example, an intranet, at the time that the save occurs, and does not require that the user select or otherwise identify or copy the screens. As an automatic function, system 10 copies one or more deal files, for example, the financial model file, the Loan Application file, and the Credit Request file, from the user's hard drive, stores them in a server database in a packaged form suitable for transmission and display over an intranet or optionally, the Internet. The user, through menu selection, instructs the system 10 to automatically populate an email message including a hyperlink to the selected screens, and to automatically send the message to one or more addressees indicated by the user.

Another optional menu choice is a tracking function, which enables the user to view all posted documents. All data which has been changed over the initial input is graphically highlighted, so that a viewer is able to view the change history by clicking on the data. This information becomes visible in a pop-up window because the data is tagged with at least the revised data author's name, date and time, and old and new value.

Still other optional menu choices include direct links to web pages providing commercially available market research data and financial reporting data, such as Dunn & Bradstreet (registered trademark). If the user has already provided the postal ZIP Code to system 10, as part of the property description, such links will automatically route system 10 to data pertinent to the deal. Similarly, links to commercial map sources, including orbital images as well as area street maps and aerial photographs are accessed the same way. Copies of such information are obtained by known Windows editing methods.

What is claimed is:

1. A method for facilitating approval of a real estate investment in a system having a plurality of remote members of a business entity, each of said plurality of remote members entering data associated with said real estate investment, the method comprising:

periodically receiving and storing loan origination data from said plurality of remote members via a plurality of data input screens, said data including financial and physical data relating to said real estate investment;

comparing automatically the input loan origination data with first data input rules and if any of said data input rules are violated, then displaying an information screen including a text message corresponding to a respective violated rule;

comparing automatically the loan origination data with second pre-determined rules and, based on results of the comparison with said second pre-determined rules, dynamically determining a set of data input and dialog screens;

comparing automatically the loan origination data with third pre-determined rules and based on results of the comparison with said third pre-determined rules dynamically calculating at least one or more profitability values, said third pre-determined rules including at least one of a debt model and an equity financial model;

displaying at least one of said profitability values on said set of data input and dialog screens;

inputting and storing user comments from at least a second one of said plurality of remote users via at least one of said data input screens;

presenting said user comments, said stored loan origination data, and said at least one or more calculated values to at least one of said remote members for approval; and generating at least one loan origination and underwriting report, said report including said stored loan origination data and said at least one or more profitability values.

2. The method as set forth in claim 1, wherein said generated reports further include stored market data, said market data describing the real estate market associated with the real estate investment.

3. The method set forth in claim 1, wherein the application is a data input application connected to a spreadsheet application.

4. The method set forth in claim 1, wherein said loan origination data includes property description values, pricing values, estimated risk values, loan terms, and cash requirements.

5. The method set forth in claim 1, wherein said loan origination data includes property cash flow values, operating expense values, and borrower description.

6. The method set forth in claim 1, wherein said loan origination data includes values representing subjective assessment of at least one of market demand, market supply, submarket demand, submarket supply, borrower business plan experience, borrower financial wherewithal, borrower behavior, and environmental issues.

7. The method set forth in claim 1, wherein the step of dynamically calculating at least one of one or more calculated values further comprises calculating at least one value of the group of values comprising return on investment, net operating income, direct capitalization, discounted cash flow, an effective gross income, cash flow after reserves, overall risk, wherein said calculation being based on inputted estimated risk values, including asset risk, market risk, and execution risk.

8. The method set forth in claim 1, wherein the steps of dynamically calculating at least one or more calculated values further comprises the steps of:

assigning respective parameters indicative of subjective risk assessment for at least one risks of a group of risks comprising environmental assessment risk, in-place rental rates relative to market risk, average lease term risk, tenant rollover risk, lease-up to stabilization risk, diversity of tenants assessment, creditworthiness of tenants assessment, stability/predictability of operating expenses assessment, redevelopment risk, repositioning risk, renovation risk, operator/management expertise required risk, capital availability assessment, investor appetite assessment, ground lease risk, and borrower experience with investment strategy assessment;

calculating an overall subjective risk value from said respective parameters; and displaying said subjective risk value.

9. The method set forth in claim 1, wherein the step of generating at least one loan origination and underwriting report includes the steps of calculating report values, said calculated report values being associated with text portions, and automatically generating word processing documents including said text portions, said input data and said calculated values.

10. The method set forth in claim 1, further comprising the step of auto-populating fields of input screens and information screens with at least one of previously entered data and calculated values.

11. The method set forth in claim 1, wherein at least one property attribute and at least one loan attribute is associated with at least one respective acquisition value, and the step of inputting and storing market data further comprises the step of selecting said at least one respective acquisition value, automatically linking to a web site, selecting and copying a data portion from the web site based on said at least one respective acquisition value.

12. The method of claim 11, wherein said at least one respective acquisition value is a postal ZIP Code.

13. The method set forth in claim 1, wherein the step of inputting and storing market data further comprises the steps of copying multimedia data relating to the real estate investment from one of a database or a web page, said copying step being accomplished by graphic input techniques, and storing said multimedia data, wherein said multimedia data includes at least an image.

14. The method set forth in claim 1, further comprising the step of automatically generating and storing a set of data screens formatted for transmission over one of an intranet or the Internet, said generated data screens being copies of data screens previously populated with input data and calculated values in connection with a specific real estate investment, and automatically generating and sending an email communication including a hyperlink web address of said stored set of data screens.

15. The method set forth in claim 1, further comprising the step of recording in computer memory a parameter indicative of revision of said computer implemented application and respective parameters indicative of changes to stored data, said changes including at least respective parameters indicative of source of change, date, and time.

16. The method of claim 1, further comprising the steps of generating a credit request said credit request including selected portions of one or more of stored loan origination data, stored market data, and stored multimedia data.

17. The method of claim 1, further comprising the steps of generating a loan application, said loan application including selected portions of one or more of stored loan origination data, stored market data, and stored multimedia data.

18. A method for facilitating approval of a real estate investment using a computer implemented application connected to a spreadsheet application, said computer implemented application having a plurality of data input and information screens accessible by a plurality of remote members of a business entity, each of said plurality of remote members entering data associated with said real estate investment, the method comprising:

periodically receiving and storing loan origination data from at least one of said plurality of remote members via said data input screens, said data including financial and physical data relating to said real estate investment;

comparing automatically the input loan origination data with first data input rules and if any of said input rules are violated, then displaying an information screen including a text message corresponding to a respective violated rule;

comparing automatically the loan origination data with second pre-determined rules and based on results of the comparison with said second pre-determined rules dynamically determining a set of data input and dialog screens;

comparing automatically the input loan origination data with third pre-determined rules and based on results of the comparison with said third pre-determined rules dynamically calculating at least one of: one or more profitability values, said third predetermined rules including at least one of a debt model and an equity financial model, at least one of said calculated values displayed on said set of data input screens;

auto-populating fields of input screens and information screens with at least one of previously entered data and calculated values;

automatically linking to a web site, selecting and copying a data portion from the web site based on a postal ZIP Code value;

inputting and storing market data, said market data describing the real estate market associated with the real estate investment;

presenting said loan origination data, said calculated values, and said market data to at least one of said members for approval; and generating at least one loan origination and underwriting report including the stored loan origination data, the stored market data, and the profitability values.

19. A system for facilitating approval of a real estate investment comprising:

a computer implemented application connected to a spreadsheet application, said computer implemented application accessible by a plurality of members of a business entity and having a plurality of data input screens configured and arranged for input of member comments and financial data including loan origination data and physical data relating to a specific real estate investment, said computer application including information screens;

said computer application including first data rules, said computer application being configured and arranged for automatic comparison of the loan origination data periodically received from at least one of said plurality of members with said input rules for determining violation of said input rules;

said computer application including second pre-determined rules, said computer application being configured and arranged for automatic comparison of the loan origination data with said second pre-determined rules, a first result of said comparison being arranged to dynamically determine a set of data input and dialog screens;

said computer application including third pre-determined rules, said computer application being configured and arranged for automatic comparison of the loan origination data with said third pre-determined rules, a second result of said comparison being arranged to dynamically calculate at least one of one or more profitability values, said third pre-determined rules including at least one of a debt model and an equity financial model; said computer application causing at least one of said profitability values to be displayed on said set of data input and dialog screens;

said computer application being configured and arranged to auto-populate fields of said input screens and information screens with at least one of previously entered data and profitability values;

said computer application being configured and arranged to automatically link to a web site, select and copy a data portion from the web site based on a postal ZIP Code value;

said computer application being configured and arranged to receive and store market data, said market data describing the real estate market associated with the real estate investment;

said computer application being configured and arranged to present said loan origination data, said profitability values, and said market data to at least one of said members for approval; and said computer application being configured and arranged to generate at least one loan origination and underwriting report including the stored loan origination data, the stored market data, and the profitability values.

* * * * *